United States Patent [19]

Funcik et al.

[11] Patent Number: 4,653,183

[45] Date of Patent: Mar. 31, 1987

[54] ELECTRICAL HARNESSES

[75] Inventors: Jack F. Funcik, Downers Grove; Clarence Kolanowski, LaGrange; Anthony R. Nugarus, Chicago; Thomas P. Pellegrino, Lisle; Frank Chmela, Downers Grove, all of Ill.

[73] Assignee: Molex Incorporated, Lisle, Ill.

[21] Appl. No.: 787,349

[22] Filed: Oct. 15, 1985

Related U.S. Application Data

[63] Continuation of Ser. No. 579,731, Feb. 13, 1984, abandoned.

[51] Int. Cl.[4] .............................................. B23P 19/00

[52] U.S. Cl. ........................................ 29/759; 29/749; 29/861

[58] Field of Search ................. 29/729, 749, 857, 759; 198/741

[56] References Cited

U.S. PATENT DOCUMENTS 4,235,015 11/1980 Funcik et al. .......................... 29/857

4,306,401 12/1981 Stohlquist et al. .............. 198/741 X 4,344,225 8/1982 Johnson, Jr. et al. ................ 29/857

4,419,817 12/1983 Funcik et al. ...................... 29/857 X 4,492,023 1/1985 Schneider et al. ................ 29/857 X

*Primary Examiner*—Howard N. Goldberg

*Assistant Examiner*—Carl J. Arbes

*Attorney, Agent, or Firm*—Louis A. Hecht; John W. Cornell

[57] ABSTRACT

A method and apparatus for manufacturing a plurality of electrical harnesses in a single machine cycle. A push bar device spaces a plurality of connectors in a predetermined, spaced relation one to another at a first station. The plurality of connectors are moved in longitudinal alignment from a first station to a second station where the connectors are each terminated to wires, for example ribbon cables. The terminated connectors then are moved back toward the first station pulling the cables with the connectors and then the cables are cut at the second station at a predetermined length. A second plurality of connectors can be loaded in predetermined spaced relation at the second station and terminated to the cut cable ends to manufacture a plurality of double-ended harnesses in a single machine cycle.

5 Claims, 18 Drawing Figures

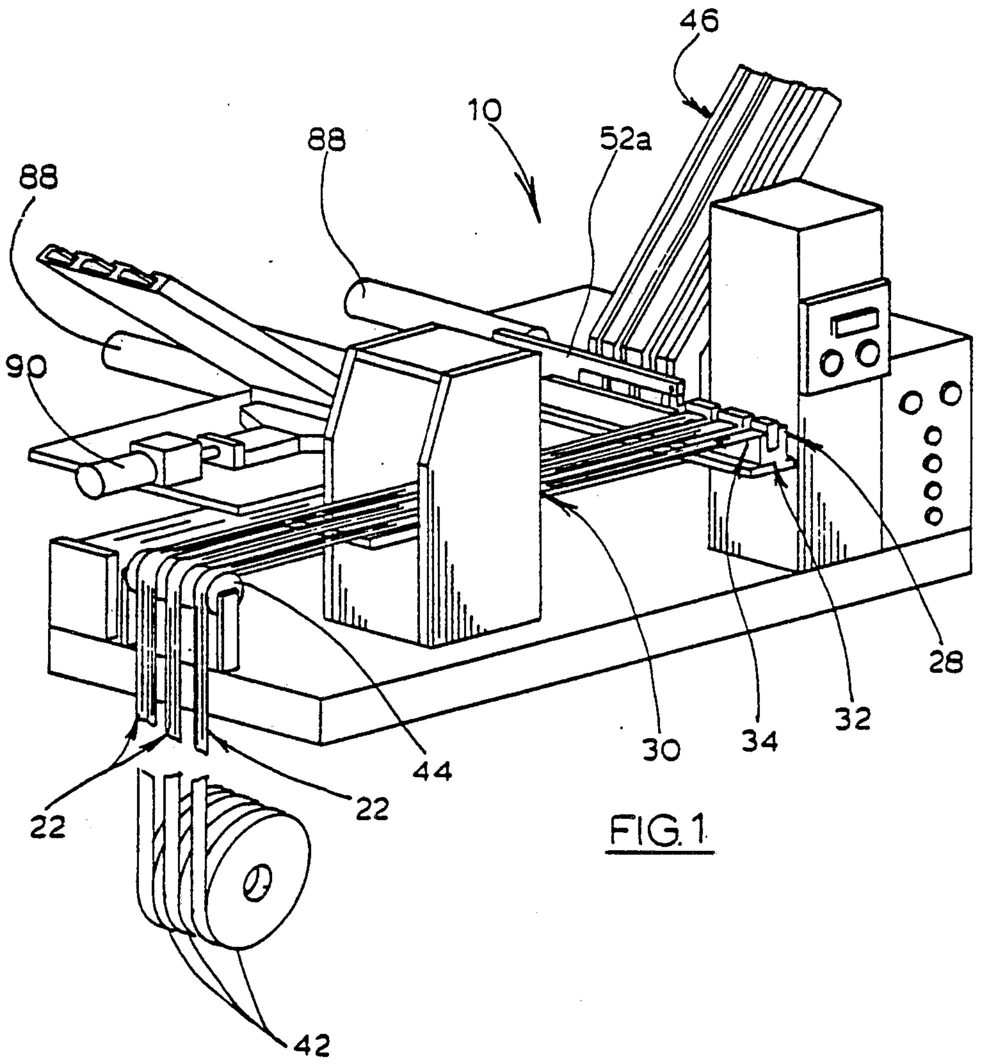
FIG. 1
FIG. 2
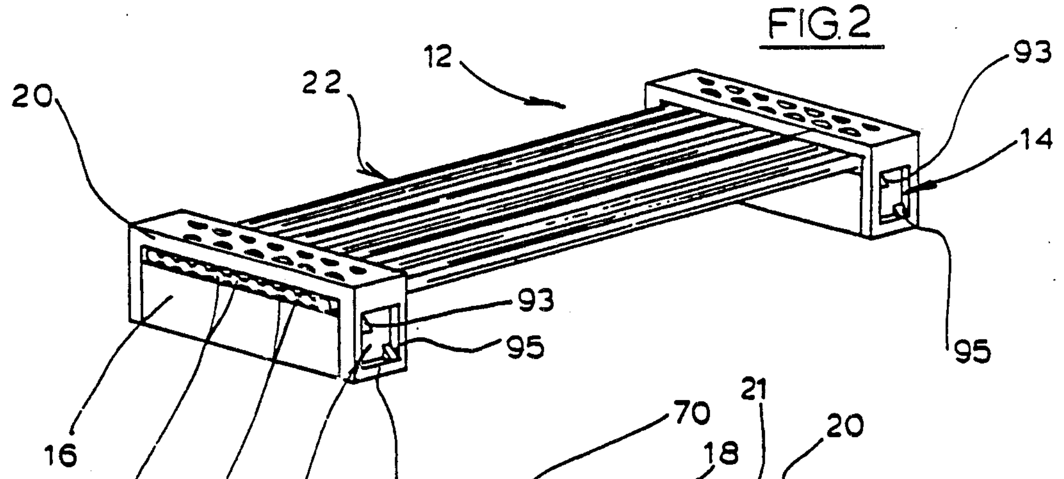
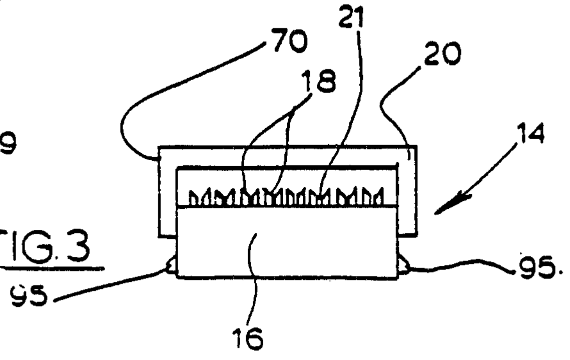
FIG. 3

FIG.7
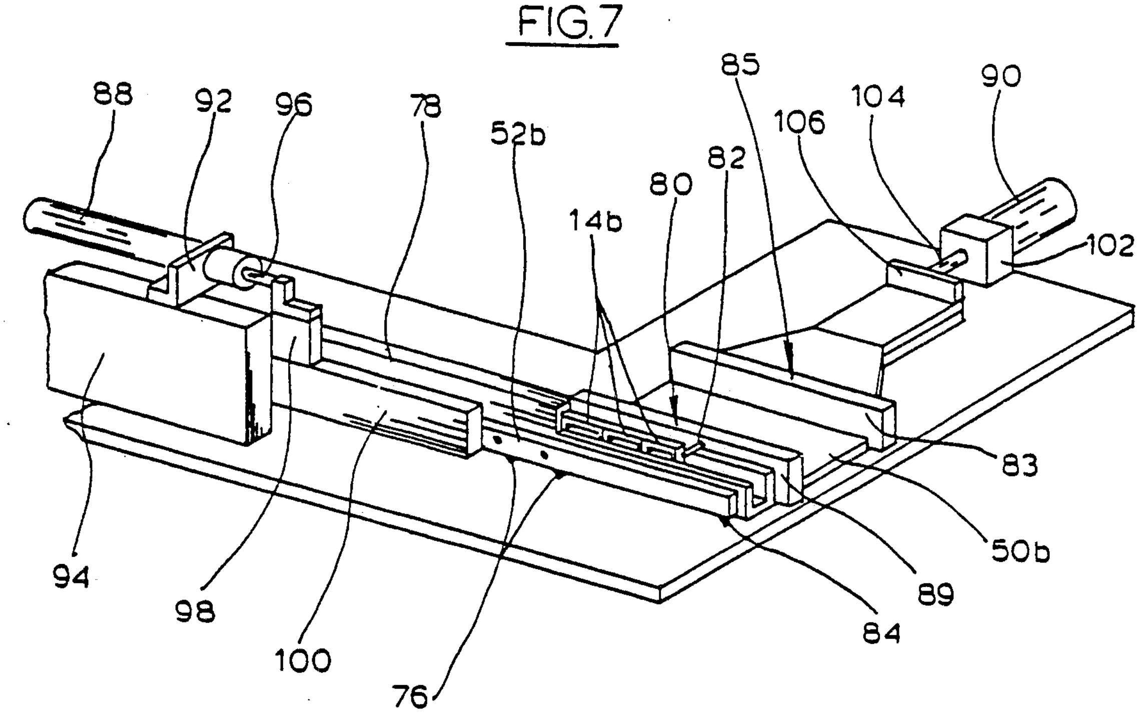
FIG.8
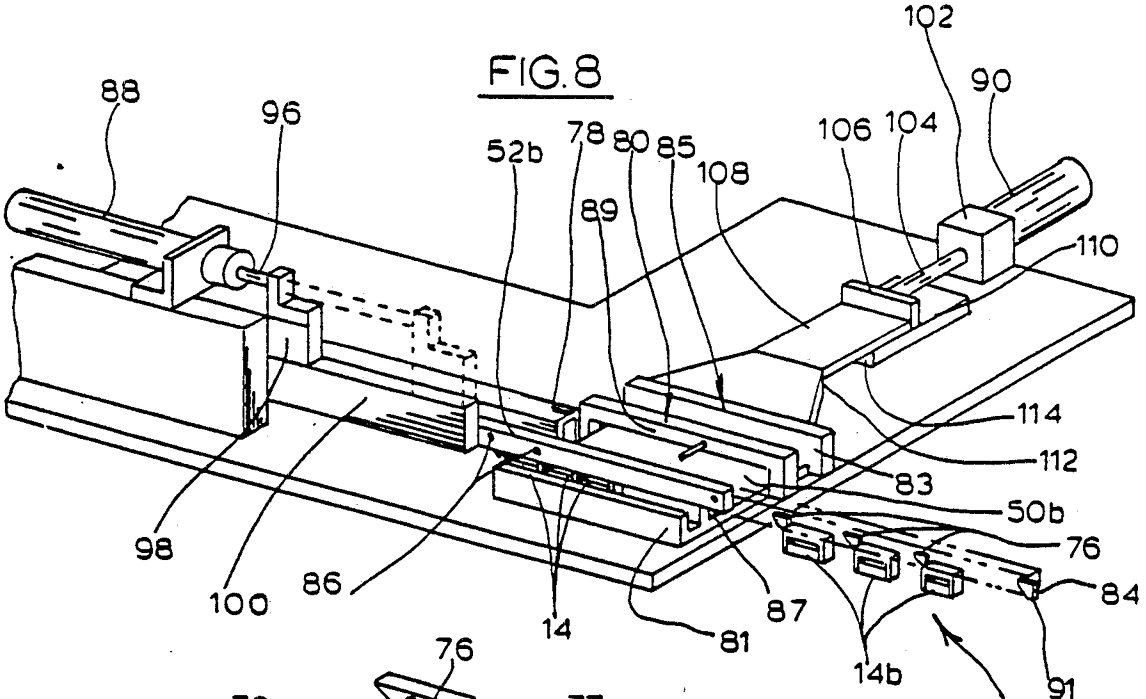
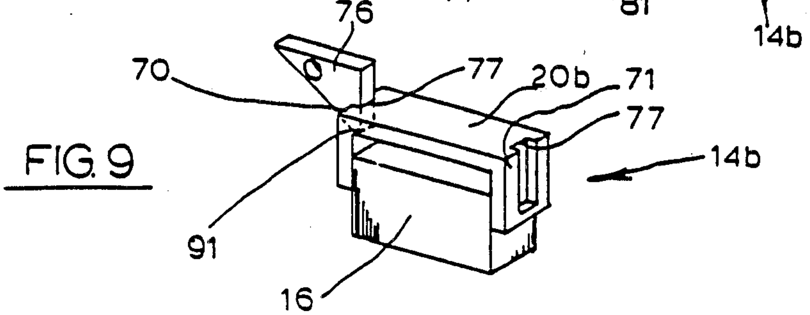
FIG.9

ELECTRICAL HARNESSES

This is a continuation of Ser. No. 579,731, filed 2—13, 1984, now abandoned.

BACKGROUND OF THE INVENTION

1. Field of the Invention

The present invention relates to a method and apparatus for making a plurality of electrical harnesses in a single machine cycle of the type including a connector having a housing with insulation displacement type contacts loaded therein, each contact connected to an insulation clad wire.

2. Brief Description of the Prior Art

More and more, manufacturers of electronic products are relying on electrical harnesses employing insulation displacement type contacts to eliminate some of the inefficiencies and costs associated with other types of electrical connections. A typical electrical harness of the type that is gaining wide acceptance is one which generally comprises a connector having a housing with insulation displacement type contacts loaded therein. Each contact is connected to an insulation clad wire. The wires of a single-ended type of electrical harness are generally of different lengths with different segments of insulation removed from the wire ends opposite the connector. In another type of electrical harness, capable of being manufactured automatically in accordance with the method and apparatus of the present invention, wires are terminated to connectors at both ends of the wires. This type of harness is called a double-ended harness.

Because of the desirability of eliminating labor costs, automatic equipment is now being employed to produce single ended electrical harnesses of the type described. One example of such a machine is disclosed in U.S. Pat. No. 4,136,440, granted on Jan. 30, 1979. In accordance with U.S. Pat. No. 4,136,440, connectors are manually loaded into a terminating station, wires are power dereeled to overlie insulation displacement contacts of the connectors, and the wires are inserted into the contacts to terminate the single-ended harness. A relatively sophisticated means of positively driving and feeding the wires is required in the method and apparatus disclosed in U.S. Pat. No. 4,136,440. The wires must be power dereeled from a second station to a first station and be driven by suitable wire feeding means. In accordance with this assignee's prior U.S. Pat. No. 4,370,806, apparatus is disclosed for making single ended electrical harnesses, one at a time, having an automatic loading and ejecting means. This assignee's prior U.S. Pat. No. 4,370,806 is hereby incorporated by reference.

SUMMARY OF THE INVENTION

It is, therefore, a principal object of the present invention to provide an improved method of making an electrical harness of the type comprising at least one connector having a housing with insulation displacement type contacts loaded therein, each contact connected to an insulation clad wire.

It is another object of the present invention to provide an improved machine which generally includes a first station whereat a plurality of connectors is initially positioned in a connector carrier in a predetermined stacked, spaced relation in a connector carrier initially disposed at the first station and automatically movable to a second station where wires are inserted into the contacts in the plurality of connectors; insertion means at the second station for simultaneously displacing each wire into its corresponding contact; a second station remote from the first station where wires are terminated in the connectors. At tne second station wires can be terminated in connectors at both ends to manufacture double ended harnesses. The connector carrier receives a plurality of connectors in a predetermined stacked, spaced relation moveable between the first station and the second station and a wire insertion or terminating means is disposed at the second station Control means moves the connector carrier from the first station to the second station, and an actuating means actuates the insertion means so that each wire is displaced in its corresponding contact, then the connector carrier moves back to the first station drawing wire therewith, and a second set of stacked spaced connectors can be terminated at the second station to form double ended harnesses.

It is another object of the present invention to provide an improved method and apparatus for manufacturing a plurality of electrical harnesses, each harness having at least one connector including a plurality of electrical contacts connected to wires, comprising, first means for spacing a first plurality of connectors in predetermined spaced relation, one to the other, first means for terminating wires in said first plurality of connectors while said first plurality of connectors are maintained in said predetermined spaced relation, and means for maintaining said first connectors in said predetermined spaced relation during relative movement between said first connectors and said first means for terminating said connectors.

It is still another object of the present invention to provide an improvement to an electrical harness making apparatus to automatically load a plurality of spaced, unattached connectors to the apparatus and eject a plurality of completed electrical harnesses from the apparatus. Each electrical harness includes at least one connector with contacts loaded therein. The apparatus includes a first station whereat a plurality of connectors are initially positioned and a plurality of completed harnesses are finally presented.

BRIEF DESCRIPTION OF THE DRAWINGS

FIG. 1 is a perspective view of the apparatus of the present invention;

FIG. 2 is a perspective view of a single, double-ended completed electrical harness made according to one embodiment of the method and apparatus of the present invention;

FIG. 3 is a side view of a connector having insulation displacement contacts and a locking and terminating cover, forming part of the electrical harnesses made in accordance with the present invention;

FIG. 7 is a perspective view of a portion of the apparatus of the present invention showing one embodiment of apparatus for initial disposition of three connectors near a first apparatus station;

FIG. 8 is another perspective view of the apparatus of FIG. 5 showing another embodiment of apparatus for loading a plurality of connectors in a predetermined spaced disposition one to another;

FIG. 9 is a perspective view showing a pawl of FIG. 8 disposed in a notched connector cover to initially space the connectors as shown in FIG. 8;

DESCRIPTION OF THE PREFERRED EMBODIMENTS

Figure 18:
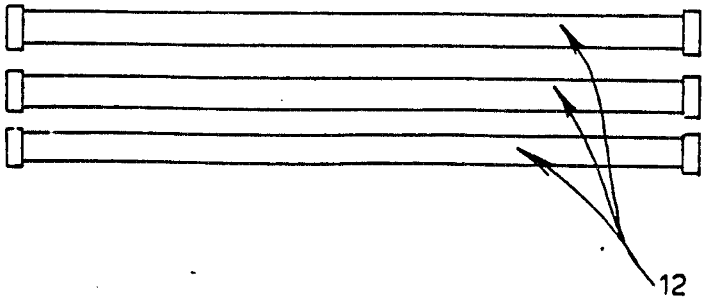
FIG. 18 is a top view of three completed electrical harnesses manufactured in a single machine cycle in accordance with the method and apparatus of the present invention.

Looking at the drawings, the electrical harness machine, generally designated 10, of the present invention is shown. The machine 10 manufactures, automatically, a plurality of completed electrical harnesses in a single machine cycle, such as the double-ended harnesses generally designated 12, as shown in FIGS. 2 and 18.

Looking at FIGS. 2 and 3 each double-ended electrical harness 12 is seen to generally include a connector, generally designated 14, at each end comprising an insulated housing 16 having a plurality of insulation displacement type contacts 18 preloaded therein and a lockable cover 20, to maintain the wires in place within the insulation displacement contacts 18, after the wires are terminated.

Each contact 18 has the usual insulation displacement type slit 21 which is adapted to slice through the insulation of insulation clad wires. As shown in FIGS. 1 and 2, the double-ended electrical harness is illustrated as being manufactured using ribbon cable, generally designated 22, having a plurality of wires or conductors 24, surrounded and interconnected by insulation 26. While the machine 10 is illustrated manufacturing a double-ended electrical harness, it is understood that the method and machine to be described hereinafter are useful for making single-ended electrical harnesses, such as shown in this assignee's prior U.S. Pat. No. 4,370,806, including single-ended harnesses having separated or discrete insulation clad wires of different or equal lengths. It is also understood that any desired size and type of connector(s), with or without locking cover(s) 20, can be used in accordance with the method and apparatus of the present invention.

BRIEF DESCRIPTION OF THE ELECTRICAL HARNESS MAKING MACHINE

Figure 4:
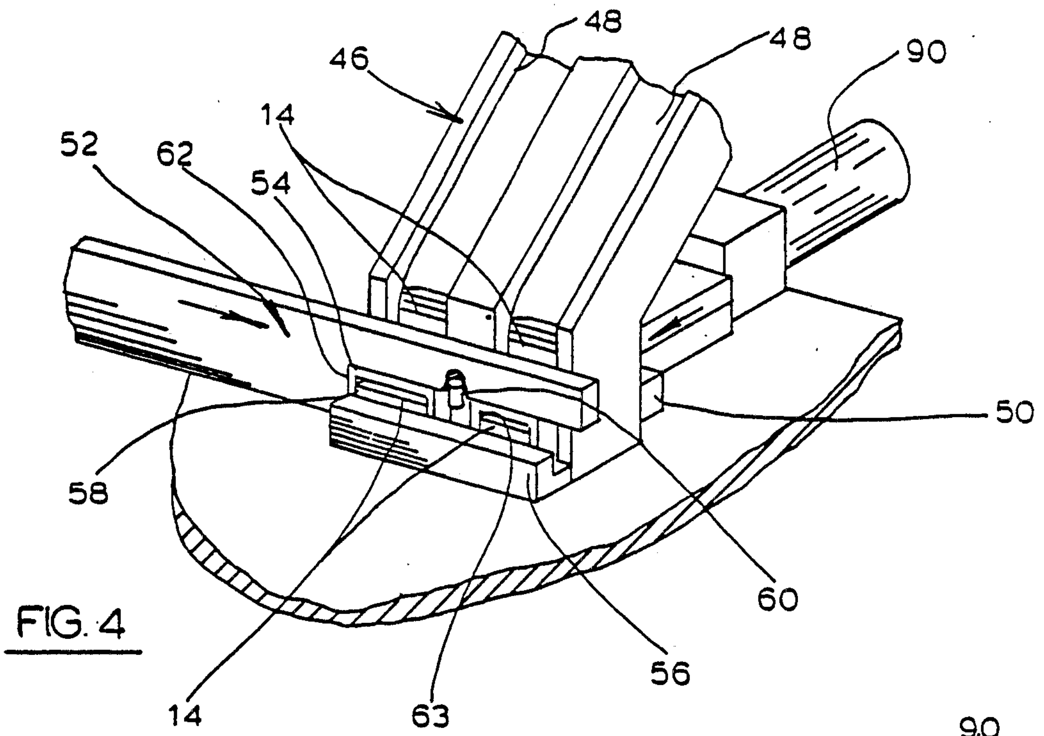
FIG. 4 is a perspective view of a portion of the apparatus of the present invention showing one embodiment of apparatus for loading a plurality of connectors in a predetermined spaced disposition one to the other.

Looking at FIGS. 1 and 4, the machine 10 is seen to generally include a first station, generally designated 28, and a second station, generally designated 30, remote from the first station. A plurality of connectors 14 are initially positioned in a stacked, spaced relationship one to another at both the first station 28 and the second station 28 and a finished electrical harness 12 is ejected from both stations 28 and 30 later in the electrical harness fabrication operation.

The conductors 24 of ribbon cable 22 are connected sequentially to the insulation displacement contacts 18 at both ends of the double-ended harness 12 at the second station 30. In addition, the ends of the ribbon cable 22 are cut at the second station 30.

The plurality of connectors 14 are positioned on a first end connector carrier, generally designated 32, which is moveable between the first station 28 and the second station 30. The connector carrier 32 includes a generally U-shaped first end connector nest, generally designated 34, having an opening 38 (FIG. 11) formed in the bottom thereof for purposes which will become more apparent hereinafter. The nest 34 is adapted to move between the first station 28 and the second station 30 on the connector carrier 32. A first connector carrier drive 116 (FIG. 10) is provided to move the connector carrier 32 and the connector nest 34 between the first station 28 and the second station 30.

A plurality of free-rolling ribbon cable reels 42 (FIG. 1) are provided near the second station 30 opposite the first station 28. The ribbon cable 22 fed from the reels 42 are guided through grooved guide and spacing roller 44 near the second station 30.

In accordance with an important feature of the present invention, as shown in FIGS. 4, 5, 7, and 8, the machine 10 of the present invention includes apparatus for initially spacing a plurality of connectors 14 in a predetermined, stacked, spaced relation one to another so that a plurality of electrical harnesses 12 can be manufactured in a single machine cycle.

In the embodiment shown in FIG. 4, a plurality of connectors 14 are loaded in a first end connector magazine, generally designated 46, having two elongated slots 48 adapted to receive two spaced stacks of connectors 14 one above the other. A connector push plate 50 is disposed immediately behind the connector magazine 46 in alignment with the pair of connectors 14 and is automatically actuated to push the lowermost pair of connectors 14 from connector magazine 46 into longitudinal alignment with a connector push bar, generally designated 52. The connector push bar 52 is disposed immediately in front of the connector magazine 46 and is actuated sequentially after actuation of the connector push plate 50 to move the lowermost plurality of connectors 14 to the first station 28 in a predetermined, stacked, spaced relation one connector to another.

The connector push plate 50 pushes the lowermost connectors 14 into a connector receiving open notch 54 under connector push bar 52. A connector stop member 56, longitudinally aligned with the connector nest 34 at first station 28, is disposed adjacent to the connector push bar 52 to limit the lateral movement of the connectors 14 caused by the connector push plate 50 and to align the plurality of connectors with the connector nest 34 at the first station 28. Actuation of the connector push plate 50 moves the illustrated pair of connectors 14 into longitudinal alignment with the connector push bar 52. The connector push plate 50, after movement of the connectors 14 into alignment with the connector push bar 52, then retracts behind the connector magazine 46 thereby allowing another pair of connectors 14 to drop down by gravity to a lowermost or ready position awaiting completion of a machine cycle after harness completion to manufacture another plurality of harnesses.

The connector push bar 52 includes a rear connector-contacting wall 58 and a connector push pin 60 extending downwardly into the connector receiving open notch 54. The rear wall 58 contacts the trailing end edge 62 of the trailing connector 14 and the push pin 60 contacts a trailing end edge 63 of the forward connector 14 so that longitudinal movement of connector toward the first station 28 push bar 52 pushes the two connectors 14 to the first station 28 and maintains the two connectors 14 in a predetermined, stacked, spaced relation, one to the other.

Figure 5:
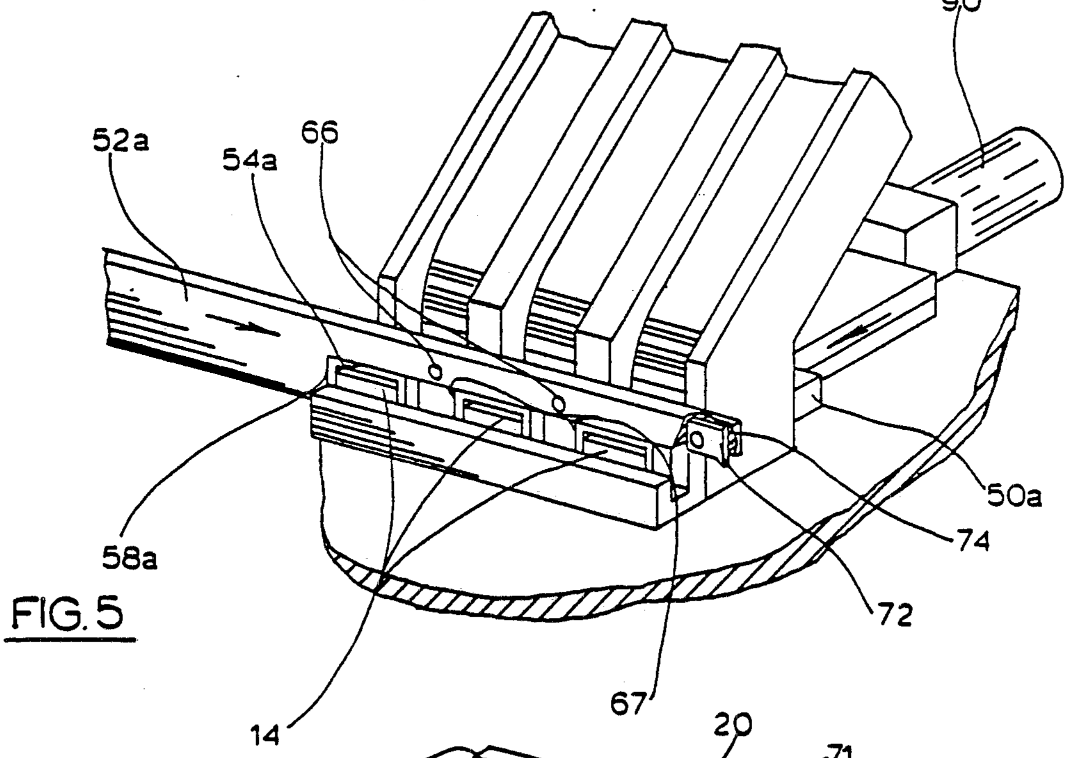
FIG. 5 is a perspective view of a portion of the apparatus of the present invention showing another embodiment of apparatus for loading a plurality of connectors in a predetermined spaced disposition one to the other.

Turning now to FIG. 5, another embodiment of a push bar, generally designated 52*a* is illustrated. The push bar 52*a* again includes a connector receiving open notch 54*a* for receiving a predetermined number of stacked, spaced connectors 14. For purposes of illustration, FIG. 5 shows a push bar 52*a* adapted to receive three spaced connectors 14 but it is understood that push bars 52 and 52*a* can be designed to accommodate any predetermined number of spaced connectors 14. A rear connector contacting wall 58A of push bar 52*a* contacts a trailing end edge of the trailing connector 14. The forward connectors are longitudinally moved to the first station 28 oy downwardly extending pawls 64 extending downwardly into the connector receiving open notch 54*a* in connector push bar 52*a*. The pawls 64 are disposed within the connector push bar 52*a* and rotatingly moveable about pins or axles 66 so that upon retreat of the push bar 52*a* to the position shown in FIG. 5, after the connectors are longitudinally moved to the first station 28, counterclockwise rotation of pawls 64 about pin 66 will rotate the pawl 64 out of the connector receiving open notch 54*a* in connector push bar 52*a*.

When the pawls 64 are in the downward position as shown in FIG. 5, a leading lower edge 67 of the pawls 64 will contact a trailing edge 70 (FIG. 3) of the front two connector 14 to push the front two connectors 14 to the first station 28 and maintain the connectors 14 in a predetermined, stacked, spaced relation, one to another. Upon retreat of the connector push bar 52*a* to the position shown in FIG. 5, the pawls 64 will rotate counterclockwise about the pins 66 upon contact of the pawls 64 with a front edge 71 (FIG. 6) of connectors 14 to drag over the top of a newly positioned set of connectors 14 without disturbing their relative position one connector to another. A completed harness eject pawl 72 is disposed on a leading edge 74 of connector push bar 52*a* to eject a plurality of completed electrical harnesses 12 from the first station 28 of the machine 10 at the same time that a plurality of new connectors 14 are being positioned in a predetermined, stacked, spaced relation one to another at the first station 28. The completed harnesses are ejected from the second station in a separate step, as described in more detail hereinafter.

In accordance with an important feature of the present invention, as shown in FIGS. 7–9, another connector push bar 52*b* is shown having a plurality of pawls 76 extending downwardly therefrom for contacting an upper notched surface 77 of a plurality of notched connectors 14*b* having notched covers 20*b*. The connector push bar 52*b* is adapted to separate the notched connectors 14*b* initially disposed in side-by-side contact, as shown in FIG. 7. As shown in FIGS. 7 and 8, an elongated tubular rectangular housing 78 is disposed adjacent to the connector push plate 50*b* to shuttle a plurality of connectors 14 into side oy side position adjacent the push bar 52*b*. Hydraulic pressure, for example, air pressure, applied to a rearward end of the elongated tubular housing 78 forces the connectors 14 within the tubular housings 78 to move forwardly in a position adjacent the push bar 52*b*, in position to be contacted by the connector push plate 50*b*, as shown in FIG. 7. The push plate 50*b* includes a U-shaped connector receiving trough, generally designated 81, moveable between longitudinal alignment with the tubular housing 78 and longitudinal alignment with the push bar 52*b*. A U-shaped connector stop supporting bar 80 is disposed adjacent the tubular housing 70, and disposed to overlie the connector push plate 50*b* to allow the connector push plate 50*b* to be received under the connector stop supporting bar 80 in reciprocal fashion. The U-shaped connector stop supporting bar 80 carries a stop pin 82 or like stop surface to limit the forward movement of the connectors 14 caused by the hydraulic air pressure within the tubular housing 78 and thereby limit the number of connectors 14 blown into position for contact and movement by the connector push plate 50*b*, as shown in FIGS. 7 and 8.

Sequentially, hydraulic pressure is applied to the rearward end of the elongated tubular rectangular housing 78 to force a plurality of connectors into position, as limited by the stop pin 82 (FIG. 7). Thereafter, the connector push plate 50*b* is actuated to push the connectors 14 into position to underlie the connector push bar 52*b* at a time when the connector push bar 52*b* is in a forward extended position at the first station 28 (FIG. 8). The forward movement of the push plate 50*b* is limited by contact of a front wall 83 stop bar generally designated 85 against a rearward surface of a stop pin supporting bar, generally designated 80 to longitudinally align the trough 81 with the push bar 52*b*. The rearward movement of the push plate 50*b* is limited by contact of a rearward wall 87 of trough 81 against a front wall 89, as shown in FIG. 7. At the same time that the push bar 52*b* initially disposes and separates the plurality of connectors 14 at the first station 28, it also ejects a plurality of completed harnesses at the first station 28 by contact with eject pawl 84. When the connector push plate 50*b* retreats to its ready position, as shown in FIG. 7, a new series of connectors 14 are blown into position against stop pin 82. The connector push bar 52*b* then retreats to the position shown in solid lines in FIG. 8 dragging pawls 76 over the tops of the notched connectors 14*b* by rotation of pawls 76 in a counterclockwise direction about pawl pins 86 to enable each of the pawls 76 to be disposed behind one of the connectors 14*b*. The connector push bar 52*b* is then ready for actuation to separate another plurality of connectors 14 and push them into position in spaced relation at the first station 28 upon completion of a machine cycle. The connector push plates 50, 50*a*, and 50*b* shown in FIGS. 4, 5, 7 and 8 as well as the connector push bars 52, 52*a*, and 52*b* shown in FIGS. 4, 5, 7 and 8 are moved in any suitable manner such as by push bar hydraulic cylinder 88 and connector push plate hydraulic cylinder 90, referred to generally as load drive or load and eject drive with reference to FIGS. 14 and 16.

In accordance with an important feature of the embodiment of the present invention shown in FIGS. 7–9, the push bar 52*b* is adapted to space a plurality of connectors 14*b* which are initially disposed under the push bar 52*b* side-by-side (not initially spaced). The push bar 52*b* is capable of initially spacing the connectors 14*b* by providing a lower connector-contacting pawl surface 91 (FIG. 9) having a size and shape adapted to fit against the notched upper surface 77 of the cover 20*b* in connector 14*b* (FIG. 9). So long as the connectors 14*b* include an upper surface, such as notched surface 77, spaced inwardly from an end edge 71 of the connector cover 20*b*, the connectors 14*b* may be initially disposed in side-by-side relation one to the other under the push bar 52b. The connector-contacting lower pawl surfaces 91 rotate counterclockwise upon contact with upper surfaces of newly positioned connectors 14 when the push bar 52-b is retracted to the position shown in sold lines in FIG. 8 to enable complete retraction of the push bar 52b. After complete retraction of the push bar 52b, each pawl 76 is initially positioned behind an end edge 70 of a closest connector, with the front two pawls 76 rotated counterclockwise and resting on a top surface of the rear two connectors 14b and the trailing pawl 76 behind the last connector 14b. Actuation of the push bar 52b forwardly toward the first station 28 pushes the lowermost edge of the forward two pawls 76 over the top surfaces of the covers 20b of the rear two connectors 14b so that the connector contacting surface 91 of the forward two pawls 76 drop down against the notched surfaces 77 of the forward two connectors 14. The covers 20b do not include top apertures large enough to permit the lowermost edge 91 of the forward two pawls 76 to fall within the tops of covers 20b. The front two pawls, therefore, are able to ride over the tops of covers 20b of the rear two connectors 14b until they drop down against the notched rear surfaces 77 in covers 20b in the first two conectors 14b. The rearward most pawl 76 is initially positioned behind the rearward most connector 14b and has nothing to ride over before making contact against the notched rear surface 77 in the rearwardmost connector 14b.

Any suitable pawl receiving opening in the upper surface of the connectors 14 may be formed in the connectors 14b to enable the pawls 76 to initially space connectors in a predetermined, spaced relation one to another at the first station 28 when the connectors 14b are initially disposed under the push bar 52b in side-by-side relation, or otherwise initially improperly spaced under the push bar 52b. The connector 14b shown in FIG. 9 is a common connector not specially manufactured for the purpose of this embodiment of the present invention. This type of connector, having a notched, locking cover 20b, is manufactured having notches in the end surfaces 70 and 71 of the cover 20b for cover locking purposes to provide pawl contacting upper surfaces 77. A lowermost edge panel 99 of the cover 20 initially is disposed above two spaced tabs 93 and 95 (see FIGS. 2 and 3) and when the cables are terminated, the cover is forced downwardly to force the edge panel 99 between tabs 93 and 95 to lock the cover 20b over the terminated wires.

As best shown in FIGS. 7 and 8, push bar hydraulic cylinder 88 (load drive) is operatively connected to hydraulically push the push bar 52, 52a or 52b longitudinally forward to the first station 28 (FIG. 8) and to retract hydraulically to the position shown in FIGS. 4, 5 and 7. The push bar hydraulic cylinder 88 is held in position by an L-shaped cylinder support bracket 92 secured to a cylinder support block 94. The hydraulic cylinder 88 includes a drive rod 96 longitudinally moveable by air pressure from cylinder 88 toward the first station 28, as shown in FIG. 8, and capable of retracting to the position shown in FIGS. 4, 5 and 7 by reverse air pressure in cylinder 88. The cylinder drive rod 96 is secured to an L-shaped push bar drive bracket 98 secured to a push bar support block 100. The push bar 52b is secured to the push bar support block 100 so that actuation of the push bar hydraulic cylinder 88 in either direction (toward first station 28 or in the retracting direction) moves the cylinder drive rod 96, the push bar drive bracket 98, the push bar support block 100, and the push bar 52, 52a, or 52b.

Similarly, the push plate hydraulic cylinder 90 (also part of the load drive) is supported on a cylinder head 102. The push plate hydraulic cylinder 90 includes a drive rod 104 secured to a push plate end wall 106. The push plate end wall 106 is secured to an L-shaped push plate cylinder connection bracket 108 slideably disposed over a slide plate 110 having an upper surface with good lubricity (e.g. release coated). A downwardly extending leg portion 112 of the L-shaped bracket 108 serves as a stop surface to limit the extent of the retraction of push plate 50, 50a or 50b by contact against an end edge 114 of the slide plate when the push plate 50, 50a or 50b is retracted from the position shown in FIG. 8 to the position shown in FIGS. 4, 5 and 7. The push plate 50, 50a, or 50b is secured to the downwardly extending leg portion 112 of the cylinder connection bracket 108 so that actuation of the push plate air cylinder 90 in either direction (toward the push bar 52, 52a or 52b as shown in FIG. 8, or in the retracting direction) moves the push plate cylinder drive rod 104, the push plate bracket end wall 106 and push plate bracket 108, and the push plate 50, 50a or 50b.

Looking now at FIGS. 1 and 10–15, and initially at FIGS. 1 and 10, the plurality of connectors 14 are positioned on the connector carrier 32 within the first end connector nest 34 as described with reference to FIGS. 4, 5, 7, and 8. The first end connector nest 34 and first end connector carrier 32 have an elongated opening 38 (FIG. 11) formed in the bottom for purposes which will become more apparent hereinafter. The nest 34 is adapted to move between the first station 28 and the second station 30. A first connector carrier drive 116 is provided to move the connector carrier 32 and connector nest 34 between the first station 28 and the second station 30.

Figure 13:
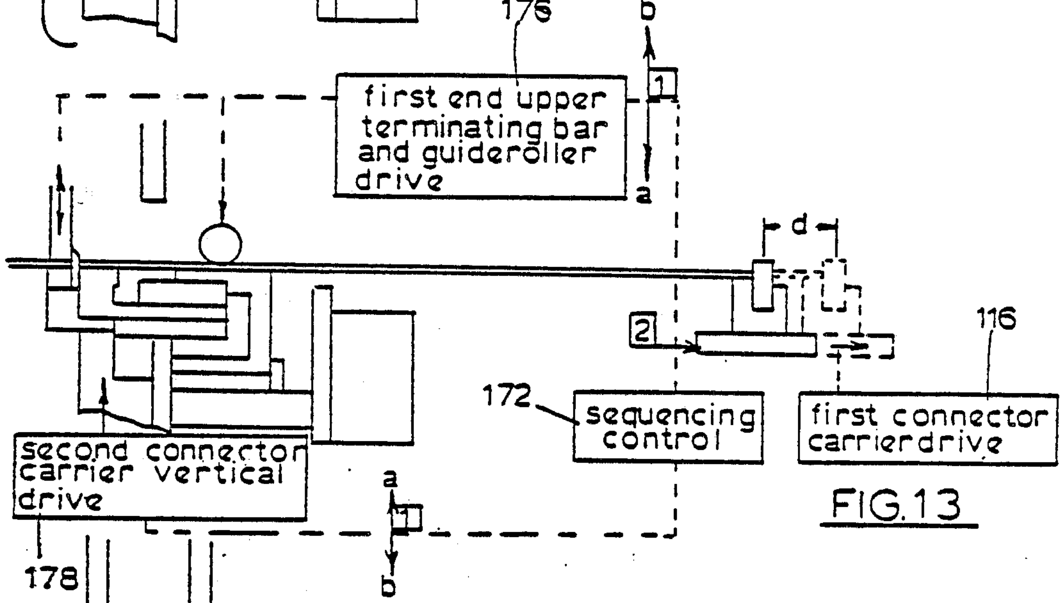
Figure 14:
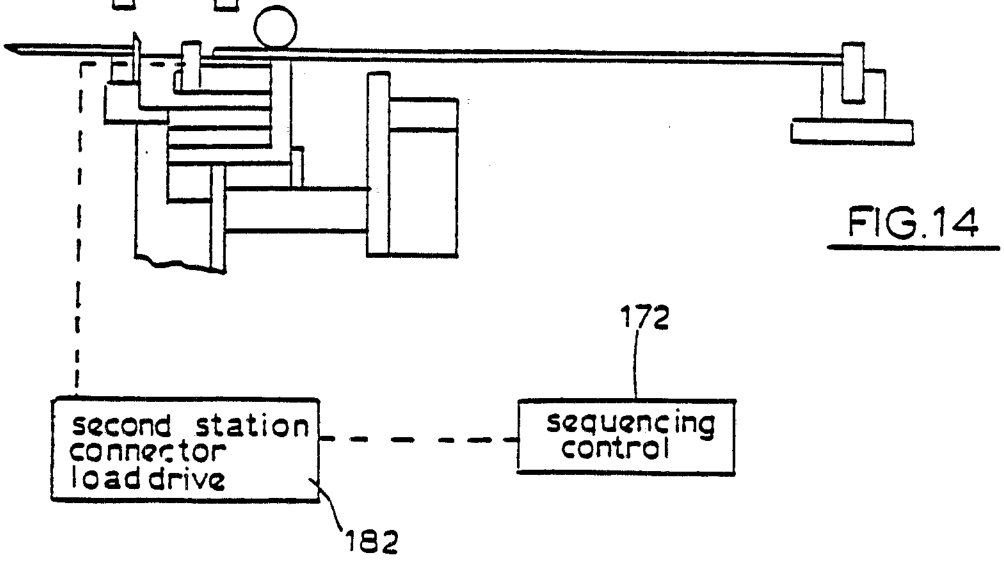
Figure 15:
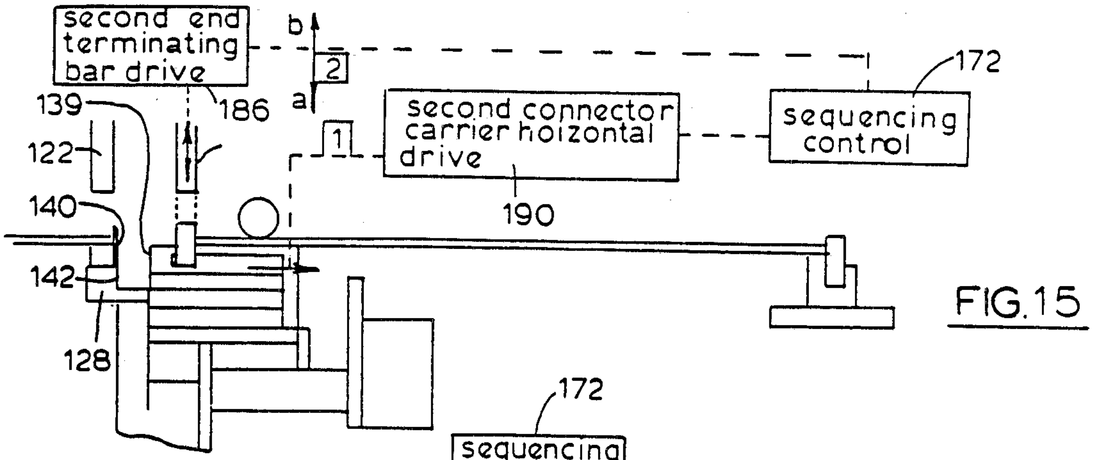

Looking at FIG. 10, the second station 30 includes a second station connector carrier, generally designated 118, shown in a downward position and capable of vertical reciprocal movement from the down position shown, upwardly toward the second station 30 and back down again, as will be described in more detail hereinafter. The second station connector carrier 118 includes a housing holder or generally U-shaped second station connector nest 120 adapted to move horizontally toward the first station 28 when the second station connector carrier 118 is in an upper position, for reasons which will become more apparent hereinafter. The entire second station connector carrier 118 (including the second station connector nest 120) is adapted to move vertically toward and way from the second station 30 (FIGS. 13–15). The second station connector nest 120 is adapted to move horizontally independently of the vertical movement of the second station connector carrier 118, toward and away from the first station 28, as described in more detail with reference to FIG. 13.

Figure 10:
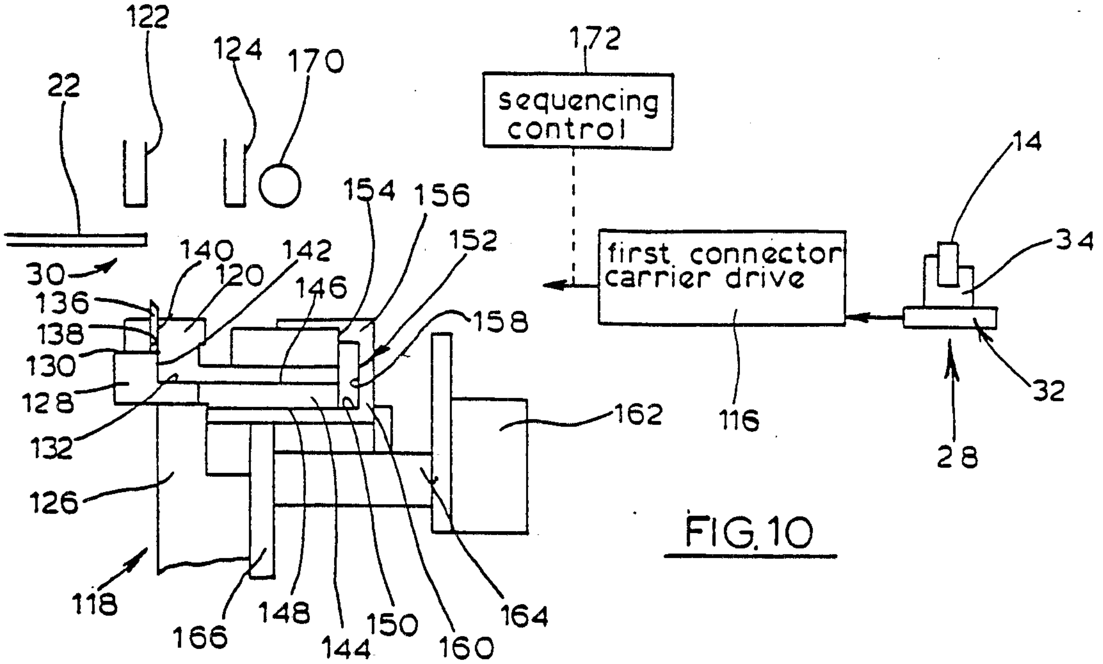
FIG. 10–17 are schematic flow diagrams illustrating the method and apparatus of the present invention at sequential stages of manufacture.

An elongated first insertion and upper cable support bar 122 is disposed at the second station 30 and is reciprocally movable down to an upper surface of ribbon cable 22 from the position shown in FIG. 10 when the ribbon cables 22 are cut to length (FIG. 13), and also reciprocally moveable downwardly to contact upper surfaces of connectors 14 for termination (FIG. 11) of a plurality of connectors 14 on a first end of ribbon cables 22. An elongated second insertion bar 124 is positioned at second station 30 and adapted for reciprocal movement downwardly, as shown and described with reference to FIG. 15, when making double-ended connectors, as will be described in more detail hereinafter.

Figure 17:
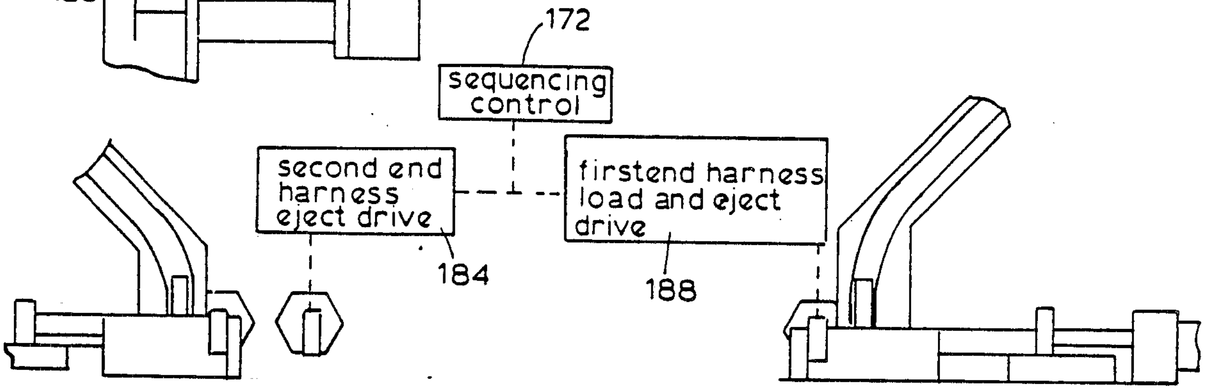

As shown in FIG. 10, the second station connector carrier 118 is actuated to an up and a down position by operative connection of drive bar 126 to a hydraulic cylinder (shown schematically in FIGS. 13 and 17 as a second station connector carrier vertical drive). The drive bar 126 carries an elongated L-shaped support bar 128 having upper elongated support surfaces 130 and 132. The upper elongated support surface 130 on the elongated L-shaped support bar 128 carries a reciprocally vertically movable first end terminating bar 134 (FIG. 11) carrying an elongated cable cutting blade 136 secured to its forward edge 138.

The second station connector nest 120 is slideably supported on the elongated support surface 132 of the elongated L-shaped support bar 128. Initially, the second station connector nest 120 is positioned so that its elongated rearward end surface 139 is in adjacent contact against a forward edge 140 of the elongated cable cutting blade 136 and against an aligned elongated surface 142 of the L-shaped support bar 128 (see FIGS. 10 and 11). The second station connector nest 120 is carried on a movable second station connector nest carrier 144 having an upper surface 146 secured to the connector nest 120 and a lower elongated surface 148 slideably supported on an upper surface 150 of a second connector carrier guide member, generally designated 152. The second station connector nest carrier 144 is received in a guide track on the elongated upper surface 150 of the second connector carrier guide member 152 and a forward surface 154 of the second station connector nest 120 is received in a guide track in an upper horizontal leg member 156 of the generally U-shaped second connector carrier guide member 152. An inner surface 158 of a base portion 160 of the second connector carrier guide member 152 acts as a stop surface to limit the horizontal movement of the second connector carrier 144 toward the first station 28, as will be described in more detail hereinafter.

In operation, the second station connector nest 120 is moved horizontally toward and away from the first station 28 hydraulically, e.g., air cylinder 162 (FIG. 10), schematically referred to as the second connector carrier horizontal drive in FIG. 15. The air cylinder 162 actuates a drive rod 164 connected to second station connector carrier drive bar 166 to reciprocally move the second station connector carrier 144 and the second station connector nest 120 horizontally between positions shown in FIGS. 14 and 15. The inner surface 158 of the base 160 of the second connector carrier guide member 152 acts as a stop to limit the horizontal movement of the connector carrier 144 and the second connector nest 120 toward the first station 28 to position the ribbon cable 122 and conductors 24 therein over the insulation displacement contacts 18, as will be described in more detail hereinafter. The drive rod 164 actuated by air cylinder 162 is operatively connected to the connector carrier 144 by being secured to the downwardly extending second station connector carrier drive bar 166 secured to a lower surface 148 of the connector carrier 144 through an elongated slotted track within lower leg portion 168 of the second connector carrier guide member 152. The second station 30 also includes a cable guide roller 170 capable of reciprocal vertical movement downwardly from the position shown in FIGS. 10–12 to the position shown in FIGS. 13–15 at the same time that the second station connector carrier 118 is moved upwardly, or can be moved up and down independently, as described in more detail hereinafter.

METHOD OF MANUFACTURE

Figure 11:
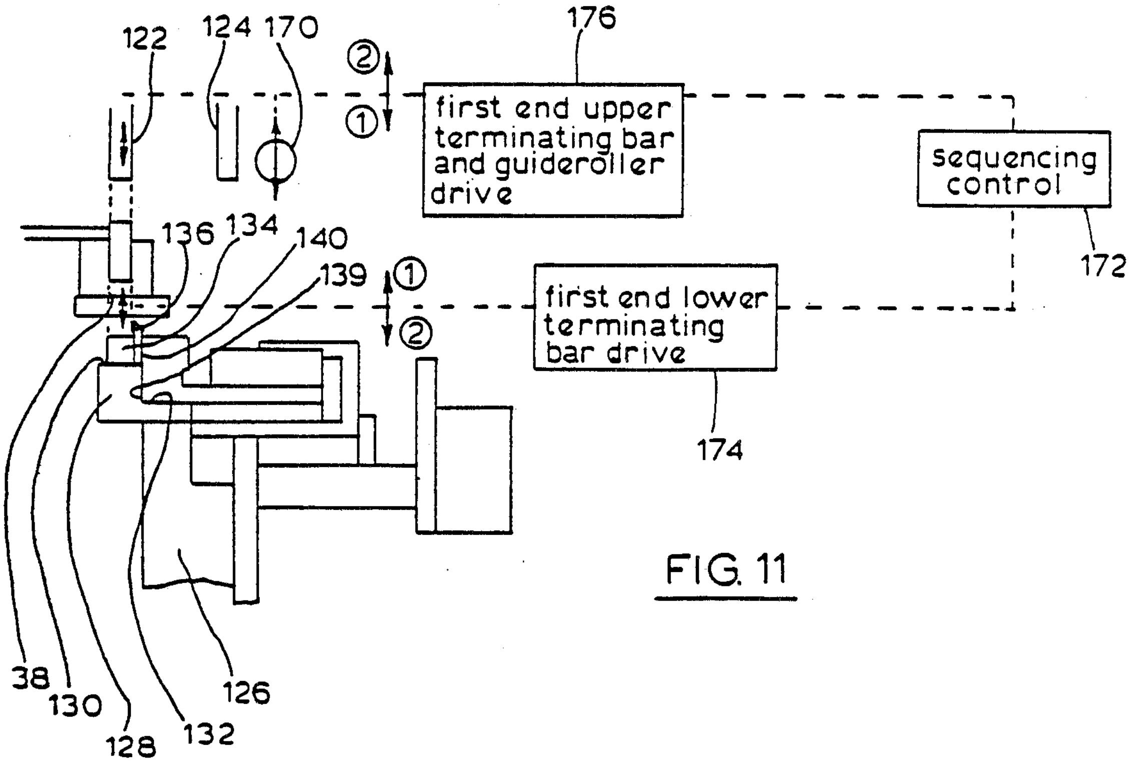

After the plurality of connectors are initially loaded into the first connector nest 34 at the first station 28, as described with reference to FIGS. 4, 5, 7 and 8, a sequencing control 172 actuates the first connector carrier drive 116 thereby moving the first connector carrier 32 and first end connector nest 34 from the first station 28 to the second station 30, as shown in FIG. 10. At the second station 30, the plurality of connectors 14 are moved into position so that the plurality of spaced ribbon cables 22 are properly positioned over the insulation displacement contacts 18 and under the connector covers 20 of the connectors 14, as shown in FIG. 11. During this operation, the second station connector carrier 118 is in a downward position as shown in FIGS. 10 and 11 so as not to interfere with the termination of the cables into the first end connectors 14 at the second station 30, as shown in FIG. 11. Once the plurality of connectors 14 are in position at the second station 30, as shown in FIG. 11, a first end lower terminating bar drive 174 is actuated by sequencing control 172 to drive the first end lower terminating bar 134 upwardly within the opening 38 in the bottom of the first connector nest 34 thereby raising the plurality of connectors 14. At the same time, the sequencing control 172 actuates a first end upper terminating bar drive 176 to move the upper terminating bar 122 downwardly against upper surfaces of the plurality of first end connectors 14 in the first end connector nest 34. The lower terminating bar 134 raises the plurality of connector housings 16 to terminate the conouctors 24 of the ribbon cables 22 into the insulation displacement contacts 18 of the connectors 14 while closing and locking the covers 20 over the lower end tabs 95 on the connectors 14. The sequencing control 172 then actuates the first end lower terminating bar drive 174 in a downward direction and actuates the first end upper terminating bar drive 176 upwardly to retract the first end lower terminating bar 134 and retract the first end upper terminating bar 122 to their positions shown in solid lines in FIG. 11. In the operation shown in FIG. 11, tne guide roller drive is not actuated.

It is to be noted (FIGS. 12–17) that the plurality of first end connectors 14 which were originally seated at the bottom of the first connector nest 34 are now in a raised position because of tne termination of the conductors 24 of the ribbon cables 22 within an upper portion of the first end connectors 14. The connectors 14 terminated at the first end assume this raised position for the remainder of the harness making cycle.

Figure 12:
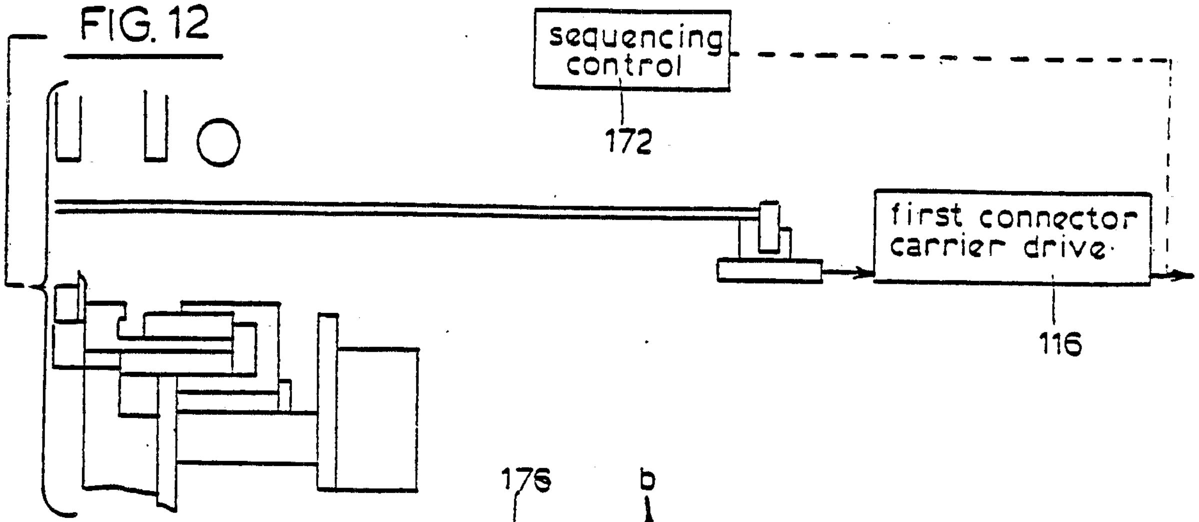

After termination of the first plurality of connectors 14 on a first end of the plurality of ribbon cables 22, as described with reference to FIG. 11, the sequencing control 172 then actuates the first connector carrier drive 116 back toward the first station 28, as shown in FIG. 12. because the ribbon cables 22 are connected to the contacts 18 within the plurality of first connectors 14, lengths of cable 22 are drawn from the reels 42 (FIG. 1) without any positive or power driving force applied to the cables themselves.

Figure 6:
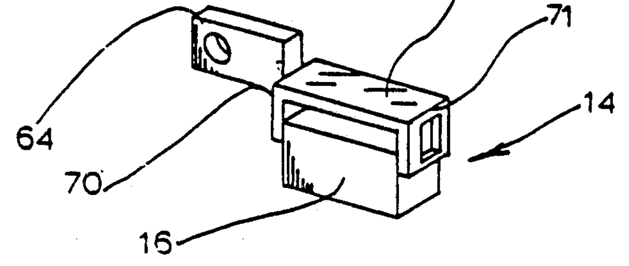
FIG. 6 is a perspective view showing a pawl of FIG. 5 contacting a connector end to shuttle the connector into position in a connector nest in a predetermined spaced relation to one or more other connectors.

In accordance with an important feature of the present invention, when double-ended harnesses are manufactured using a locking cover type connector 14 as shown in FIGS. 3 and 6 and 14*b* as shown in FIG. 9, the movement of the first connector carrier drive 116, as actuated by sequencing control 172, as shown in FIGS. 11 and 12, is stopped a distance D (FIG. 13) before the first connector carrier 32 is fully retracted to the first station 28. When the first connectors 14 are in the position shown in solid lines in FIG. 13, a distance D from the first station 28, the sequencing control 172 then actuates a second connector carrier vertical drive 178 upwardly while at the same time actuating the first end upper terminating bar and guide roller drive 176 downwardly. The upward movement of the second station connector carrier 118 while an upper surface of the cables 22 are supported by the first end upper terminating bar 122, cuts the plurality of cables 22 with the elongated cable cutting blade 136, as shown in FIG. 13.

After the plurality of ribbon cables 22 are cut by the cutting blade 136, the sequencing control 172 actuates the first connector carrier drive 116 thereby moving the first connector carrier 32 toward the first station the distance D to a fully retracted position at the first station 28, as shown in dashed lines in FIG. 13. The movement a distance D toward the first station positions the second end connectors 14 over the ends of cables 22 to properly position the conductors 24 over the insulation displacement terminals and under the covers 20. It is understood that this step is not needed if the connectors do not have covers 20. During the sequencing steps outlined with reference to FIGS. 10–13, second connector nest 120 carried by the second station connector carrier 118 has not yet received a second set of connectors 14. If the second connector nest 120 were loaded with a plurality of connectors 14 prior to attempting to cut the plurality of ribbon cables 22, as shown in FIG. 13, upper surfaces of the second set of connectors 14 would contact a lower surface of the ribbon cables 22 extending above the second connector nest 120 thereby withdrawing different small amounts of ribbon cable 22 from the reels 42 depending upon the distance that the connectors 14 extend above the second connector nest 120. Accordingly, it is important that the second connector nest 120 is not loaded with a second plurality of connectors 14 until after the ribbon cables 22 are cut by the elongated cable cutting blade 136 and after the first connector carrier 32 is fully retracted to its position shown in dashed lines at the first station 28 (FIG. 13) to withdraw the plurality of ribbon cables to the position shown in FIG. 14.

After the first end connectors 14 are fully retracted to the first station 28, as shown in dashed lines in FIG. 13 and in solid lines in FIG. 14, a second set of connectors 14 is loaded within the second connector nest 120 without interference from the plurality of ribbon cables 22, as shown schematically in FIG. 14. The sequencing control 172 actuates the second station connector load drive 182 (FIG. 14) including a connector push plate drive and a connector push bar drive, described with reference to FIGS. 4, 5, 7 and 8. The loading of a plurality of stacked, spaced connectors into the second station connector nest 120 at the second station 30 is accomplished in the same manner using a mirror image of the loading devices described with reference to FIGS. 1, 4, 5, 7, and 8. The second ends of the harnesses are not yet completed through a complete machine cycle when the connectors 14 are loaded at the second station 30. Completed second ends, therefore, cannot be ejected at the same time that a plurality of connectors 14 are shuttled or loaded into the second station connector nest 120. Accordingly, as will be described with reference to FIG. 17, a separate second end harness eject drive 184 is actuated to eject the second ends of completed harnesses at the same time that the first station load and eject drive 188 (FIG. 17), comprising push plate air cylinders 90 and push bar cylinder 88, are actuated.

After the second set of connectors 14 are loaded within the second connector nest 120 in a predetermined, stacked, spaced relationship one to another, in the same manner as the positioning of the first set of connectors 14 within the first connector nest 34, as described with reference to FIGS. 4, 5, 7 and 8, the sequencing control 172 actuates a second connector carrier horizontal drive 190, moving the second station connector nest 120 the distance D toward the first station 28, as shown in FIG. 15, to position the plurality of cut ribbon cables over the insulation displacement contacts 18 and under the connector covers 20 of the connectors 14. The plurality of connectors 14 are then in position for termination of the conductors 24 within the insulation displacement contacts 18. A second end terminating bar drive 186 then is actuated by the sequencing control 172 to lower the second end terminating bar 124 against the connector covers 20 and push the connector covers 20 downwardly to lock the covers 20 over the lower housing tabs 95 (FIG. 2) and terminate the conductors 24 within the insulation displacement contacts 18 in the connectors 14 to complete the double-ended harness 12 (FIG. 15). The sequencing control then actuates the second end terminating bar drive 186 and the cable guide roller drive 180 to move the second end terminating bar 14 and the cable guide roller 170 upwardly (FIG. 15) to release the second end of the completed harness 12 so that the plurality of double-ended harnesses 12 can be ejected from the machine 10.

Figure 16:
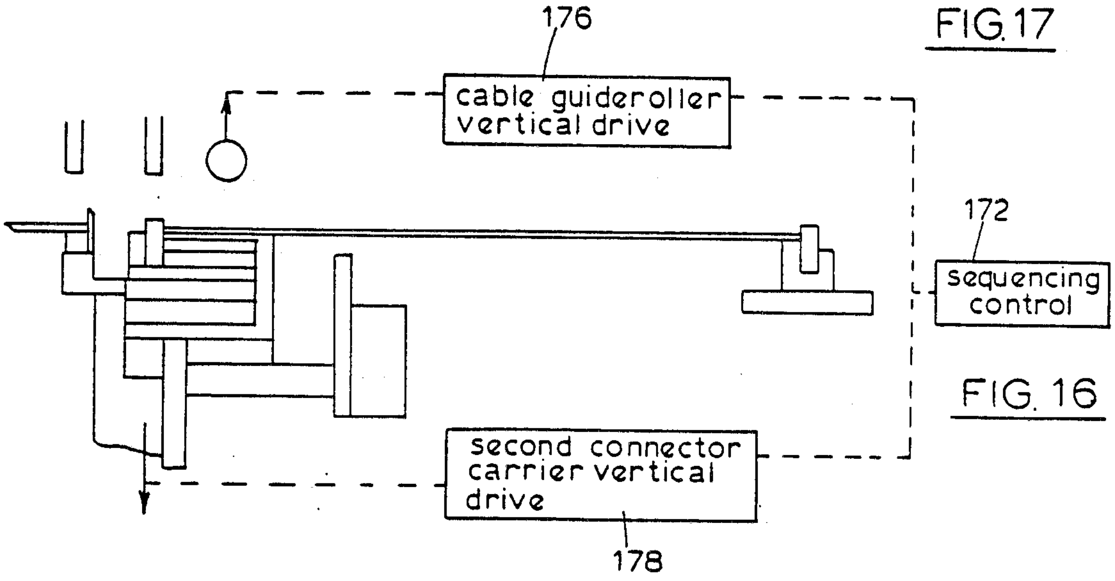

As shown in FIG. 16, sequencing control 172 actuates the cable guide roller vertical drive to raise guide roller 170, and actuates second connector carrier vertical drive 178 to lower second connector carrier 118.

As shown in FIG. 17, and briefly described above, the separate second station harness eject drive 184 actuated by sequencing control 172, powers a separate push bar mechanism which can be structurally the same as the push bars 52, 52A or 52*b* described with reference to FIGS. 4, 5, 7 and 8, to eject the second ends of completed harnesses 12 from the second station 30. It is understood that the second end eject push bar (not shown) need not include a downwardly extending tab or downwardly extending pawls, since the harnesses 12 will be contacted only at the most forward end during ejection. At the same time, the first end load and eject drive 188 (FIG. 17) is actuated by the sequencing control 172 to move the push plate 50 or 50A and then the push bar 52 or 52A to position the plurality of connectors 14 in spaced relation within the first station connector nest 34. Alternatively, when the plurality of connectors 14 are shuttled into position against stop pin 82 from tubular housing 78, as described with reference to FIGS. 7 and 8, the first end load and eject drive 188 sequentially forces a plurality of connectors against the stop pin 82 with an air cylinder (not shown) actuated by the sequencing control 172, before the push plate 50*b* and the push bar 52*b* are sequentially actuated.

We claim:

1. In an apparatus for simultaneously fabricating a group of electrical harnesses, each harness including a connector terminated to a plurality of wires, a connector feeding assembly for feeding a group of individual connectors from a first connector loading station whereat said group of connectors are disposed in a row, to a second termination station whereat said group of connectors are mass terminated to said wires, said connector feeding assembly comprising:

connector spacing means mounted for movement between said first and second stations, engageable with said group of connectors to space said connectors predetermined distances apart from each other and to move said connectors therewith; and means for moving said connector spacing means from the first station to the second station, whereby the connectors are moved to said second station while maintaining said predetermined distances.

2. The feeding assembly of claim 1 wherein said spacing means comprises an elongated push bar overlying said connectors and having a plurality of depending members mounted on the bar for movement therewith for engaging each of said connectors.

3. The feeding assembly of claim 2 wherein said depending members comprise a plurality of pins extending downwardly from said push bar with a free end for engaging each connector.

4. The feeding assembly of claim 2 wherein said depending means comprise a plurality of pawl members mounted on said push bar and having a portion for engaging each connector.

5. The feeding assembly of claim 4 wherein said pawl members are mounted on the push bar for extension and retraction of said connector engaging portions, whereby said connector engaging portions are extended and engaging said connectors when said push bar is moved from said first station to said second station and are retracted when said push bar is moved from said second station back to the first station.

* * * * *